United States Patent
Hoetzer et al.

(10) Patent No.: US 8,564,729 B2
(45) Date of Patent: Oct. 22, 2013

(54) DUAL-SIDED DISPLAY FOR VEHICLE REAR-VIEWING SYSTEM

(75) Inventors: Dieter Hoetzer, Plymouth, MI (US); Yun Luo, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 404 days.

(21) Appl. No.: 12/905,326

(22) Filed: Oct. 15, 2010

(65) Prior Publication Data

US 2012/0092497 A1    Apr. 19, 2012

(51) Int. Cl.
*H04N 7/18*    (2006.01)

(52) U.S. Cl.
USPC .......................................... 348/837; 348/836

(58) Field of Classification Search
USPC .......................................................... 348/837
See application file for complete search history.

(56) References Cited

U.S. PATENT DOCUMENTS

| | | | |
|---|---|---|---|
| 6,304,173 B2 * | 10/2001 | Pala et al. ...................... | 340/461 |
| 7,564,479 B2 * | 7/2009 | Schedivy ...................... | 348/148 |
| 7,990,416 B2 * | 8/2011 | Kuwata ......................... | 348/148 |
| 2006/0050018 A1 | 3/2006 | Hutzel et al. | |
| 2006/0232672 A1 * | 10/2006 | Sim et al. ...................... | 348/148 |
| 2008/0136911 A1 * | 6/2008 | Shaffer et al. ................. | 348/148 |
| 2008/0211735 A1 * | 9/2008 | Balcerzak et al. ............. | 345/3.1 |

FOREIGN PATENT DOCUMENTS

| | | |
|---|---|---|
| GB | 2405280 | 2/2005 |
| JP | 5294189 | 11/1993 |
| JP | 11129815 | 5/1999 |
| JP | 2004330873 | 11/2004 |

OTHER PUBLICATIONS

PCT/US2011/056373 International Search Report and Written Opinion dated Jan. 26, 2012 (12 pages).

* cited by examiner

*Primary Examiner* — Andy Rao
(74) *Attorney, Agent, or Firm* — Michael Best & Friedrich LLP

(57) ABSTRACT

A display system for a vehicle including a dual-sided display panel pivotably mounted to the interior ceiling of the vehicle. The dual-sided display panel displays an image from a media device to a rear-seat passenger of the vehicle and displays a different image to the driver on a second side of the display panel. The second side of the display panel is viewable by a driver of the vehicle through a rear-view mirror. A user-operated switch indicates what video source is displayed to the driver on the second side of the display panel. A first selectable video source is a camera mounted on the rear of the vehicle to capture rear-view images of the exterior behind the vehicle. A second selectable video source is a camera mounted in the rear passenger area of the vehicle to capture images of a rear-seat passenger.

14 Claims, 5 Drawing Sheets

DUAL-SIDED DISPLAY FOR VEHICLE REAR-VIEWING SYSTEM

BACKGROUND

The present invention relates to systems for improving rear-viewing in passenger automobiles.

Some current passenger vehicles can be fitted with a video entertainment system for use by passengers riding in the rear seating area of the vehicle. A display for the entertainment system is often mounted from the interior ceiling of the vehicle near or behind the driver seat. The display is positioned so that video content can be viewed by passengers in the rear of the vehicle.

SUMMARY

When a rear-seat passenger entertainment system is mounted from the interior ceiling of the vehicle is can obstruct the view of the center-mounted interior rear-view mirror. The obstruction reduces the drivers visibility and can cause unsafe conditions. Embodiments of the present invention utilize a dual-sided display panel to reduce the inconvenience caused by the obstruction of the rear-view mirror and to provide improved rear-viewing functionality for the driver of the vehicle.

In one embodiment, the invention provides a display system for a vehicle including a display panel, at least two cameras, a switch, and a processor. The display panel includes two display screens—one on each side of the panel—and is pivotably mountable to the interior ceiling of a vehicle by a hinge. The hinge allows the display panel to be moved between a first panel position where the display panel is substantially perpendicular to the interior ceiling of the vehicle and a second panel position where the display panel is substantially parallel to the interior ceiling of the vehicle. When the display panel is in the first panel position, the first side display screen is viewable by a rear-seat passenger in the vehicle and the second side display screen is viewable by a driver of the vehicle through an interior rear-view mirror. The processor displays images from a media device, such as a DVD player or video game system, on the first side display. The switch is used to select between at least two video sources to be displayed on the second side display screen and viewed by the driver while operating the vehicle. When selected using the switch, the first camera provides a rear-view image of the exterior of the vehicle to be displayed on the second side display screen. When the second camera is selected, the second side display screen shows images of the rear-seat passenger. The second camera can be used as a child-monitoring system.

In some embodiments, the display system automatically lowers the display panel from the second position to the first position when the vehicle begins operating in reverse. By automatically lowering the display panel into the field of view of the rear-view mirror, the driver is provided with additional information and a camera view to assist the driver in operating the vehicle in reverse. When the vehicle stops operating in reverse, the system determines whether the display panel was originally in the raised, second position and, if so, the system returns the display screen to the second position.

In another embodiment, the invention provides a method of operating a display system for a vehicle including a dual-sided display panel pivotably connected to a base allowing the dual-sided display panel to be moved between a first panel position and a second panel position. The dual-sided display panel is positioned in a first position so that a first side display screen is viewable by a rear-passenger of the vehicle and a second side display screen is viewable by the driver of the vehicle through an interior rear-view mirror. According to the method, an image from a media device is displayed on the first side display screen. A signal is received from a user-operated switch indicating whether the switch is in a first or second switch position. If the switch is in the first position, an image from a camera mounted on the rear of the vehicle is displayed on the second side display screen. If the switch is in the second position, an image from a camera mounted in the rear passenger area of the vehicle is displayed on the second side display screen. The second camera is positioned to capture images of the rear-seat passenger of the vehicle.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
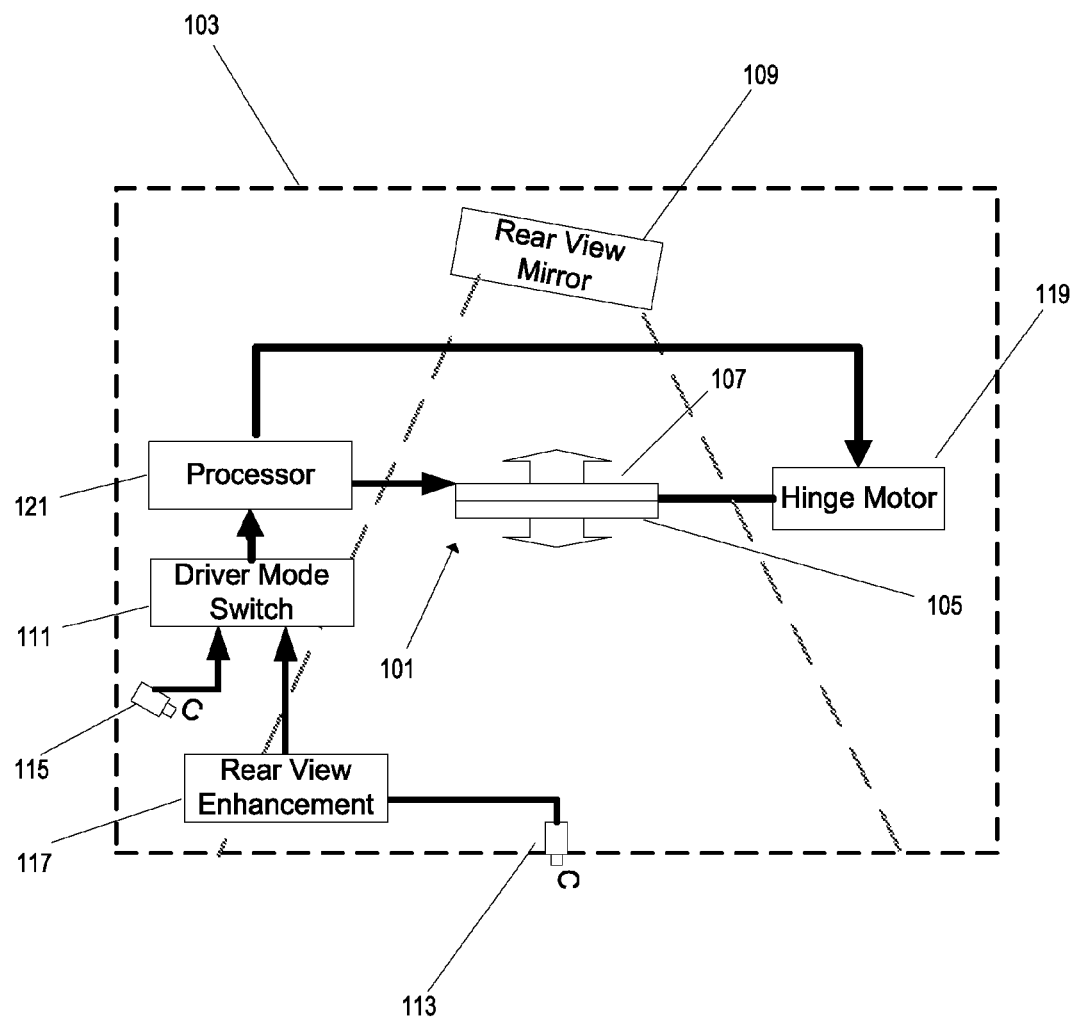
FIG. 1 is a block diagram of a display system as installed in a vehicle.

The block diagram of FIG. 1 illustrates a display system that includes a dual-sided display panel 101 that is mountable to the interior 103 of a vehicle. The display panel 101 is a flat-panel type display monitor that includes two display screens 105, 107 each on opposite sides of the display panel. When installed in a vehicle, the display panel 101 is positioned in the range of view of an interior rear-view mirror 109. A driver mode switch 111 is user-operable and controls which video source provides images to be displayed on the forward-facing display screen 107. In the illustrated embodiment, the driver mode switch 111 is used to select between images captured by a first camera 113 and images captured by a second camera 115. As described in further detail below, images from a camera can be processed by a rear view enhancement module 117 before they are displayed on the forward-facing display screen 107. A hinge motor 119 is also connected to the display panel 101 to raise or lower the display panel 101 as described below. The system also includes a processor 121 that, among other things, controls the images displayed on both display screens 105, 107 and controls the hinge motor to adjust the position of the pivotable display panel. In various embodiments, the processor 121 is implemented in hardware, software, or a combination of hardware and software. As will be recognized by those skilled in the art, the processor 121 can include for example one or more of a microcontroller, a microprocessor with appropriate memory and I/O devices, a field programmable gate array (FPGA), an application specific integrated circuit (ASIC), a digital signal processor (DSP), or the like.

Figure 2:
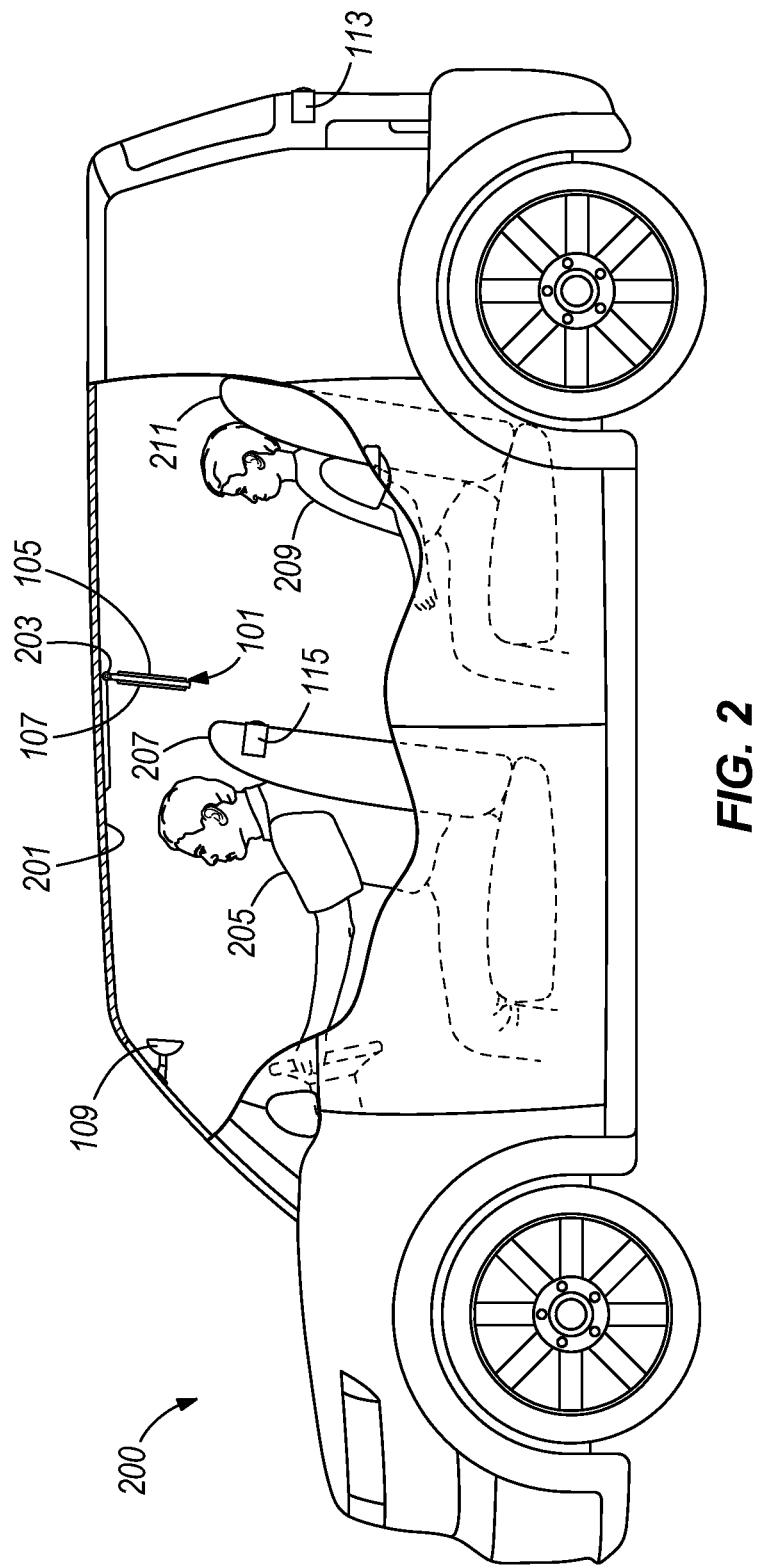
FIG. 2 is a cut-away view of a vehicle including the display system of FIG. 1.

FIG. 2 illustrates how the components of the display system are arranged in a vehicle 200. The dual-sided display panel 101 is pivotably connected to the interior ceiling 201 of the vehicle by a hinge 203. The rear-facing display screen 105 is positioned to display video images to passengers seated in the rear of the vehicle. The forward-facing display screen 107 is positioned on the side of the display panel 101 opposite the rear-facing display screen 105. The dual-sided display panel 101 is positioned so that the image displayed on the forward-facing display screen 107 is reflected by the interior rear-view mirror 109 and is thereby viewable by a driver 205 seated in the front seat 207 of the vehicle 200. The rear-facing display screen 105 is directly viewable by a passenger 209 seated in the rear seat 211 of the vehicle 200.

Figure 3:
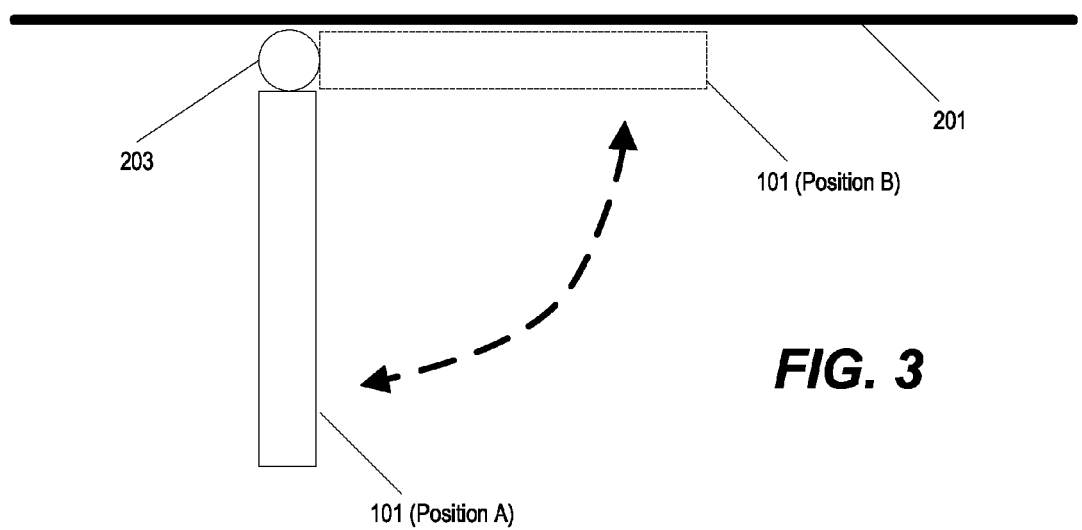
FIG. 3 is a side view illustrating two positions of the display panel.

As illustrated in FIG. 3, the display panel 101 is pivotably mounted to the ceiling of the vehicle 201 by a hinge 203. The hinge allows the display screen to be moved from a first position (Position A) to a second position (Position B). When in the first position (Position A), the dual-sided display panel 101 is positioned substantially perpendicular to the interior ceiling of the vehicle 201. However, the exact angle of the dual-sided display panel 101 relative to the ceiling 201 is user adjustable to allow for comfortable viewing of the video images displayed on the rear-facing display screen 105. When in the second position (Position B), the dual-sided display panel 101 is substantially parallel to the ceiling 201. As noted above, the system includes an electric motor 119 configured to raise and lower the dual-sided display panel 101.

Figure 4:
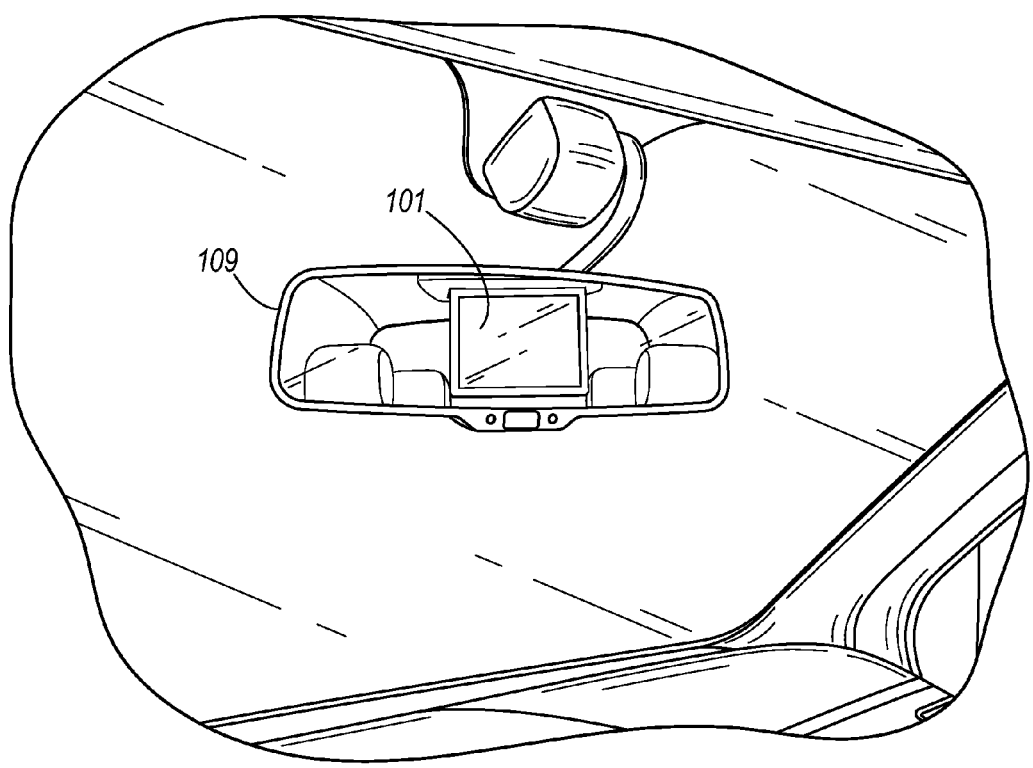
FIG. 4 is a perspective view of the dual-sided display panel as seen through a rear-view mirror of the vehicle.

As illustrated in FIG. 4, when the dual-sided display panel 101 is lowered into the first position (Position A), the dual-sided display panel 101 at least partially blocks the driver's view through the rear-view mirror 109. Therefore, when the rear-facing display screen 105 is not in use by a rear-seat passenger 209, the dual-sided display panel 101 can be moved to the second position (Position B). When in the second position (Position B), the dual-sided display panel lies flush against the ceiling 201 and does not block the driver's view through the rear-view mirror 109. In some embodiments, the system includes a housing set within the ceiling 201. In such embodiments, when the dual-sided display panel 101 is in the second position (Position B), the dual-sided display panel 101 fits within the housing and the ceiling 201 appears to be flat and uniform.

The video sources displayed on each side of the dual-sided display 101 are independently selectable. As such, the video image displayed on the rear-facing display screen 105 can be different than the video image displayed on the forward-facing display screen 107. In some embodiments, the rear-facing display screen 105 outputs video from a media entertainment device such as, for example, a DVD/Blu-Ray player, a television tuner, or a video game system. However, instead of only obstructing the driver's view through the rear view mirror 109, the forward-facing display screen 107 provides additional information or views that are not generally available through the rear-view mirror 109 of the vehicle.

As illustrated in FIG. 1, a driver 205 of the vehicle selects between the available video sources using the driver mode switch 111. The illustrated system includes two cameras mounted on the vehicle as selectable video sources. However, in other constructions, the driver mode switch 111 will include different or additional video input sources. When the driver mode switch 111 is in a first position, video images captured by the first camera 113 are displayed on the forward-facing display screen 107. Similarly, when the driver mode switch 111 is in a second switch position, video images captured by the second camera 115 are displayed on the forward-facing display screen 107.

As illustrated in FIG. 2, the first camera 113 is positioned on the rear of the vehicle and configured to capture video images of the exterior behind the vehicle. In the illustrated system, the first camera 113 is mounted at the center of a rear of the vehicle 200. In other systems, the first camera 113 is mounted into the rear bumper of the vehicle or near the top of the rear window of the vehicle. The second camera 115 is positioned within the rear-seating area of the vehicle and is configured to capture video images of the rear-seat passengers. In many vehicles, the rear-view mirror 109 is designed to provide views of the exterior behind the vehicle. As such, the driver's view of the rear-seat passengers are not within the view range of the rear-view mirror or are obstructed by the vehicle seats or by the heads of the front-seat vehicle passengers. The second camera 115 provides a more direct view of the rear-seat passengers and is viewed directly through the rear-view mirror 109.

Before images from the first camera 113 are displayed on the forward-facing display screen 107, they are processed by a rear-view enhancement system 117 (FIG. 1). The rear-view enhancement system 117 includes one or more processing features to improve the image of the rear exterior behind the vehicle before it is displayed on the forward-facing display screen 107. In some systems, the rear-view enhancement system 117 analyzes the captured images to identify objects of interest such as, for example, vehicles, pedestrians, small animals, walls, or curbs. The video images are also adjusted using perspective transformation. Although the videos captured by the first camera 113 are from a different perspective than usually seen in the rear-view image, the rear-view enhancement system 117 crops the images captures by the first camera 113 so that the image displayed on the forward-facing display screen 107 replicates the range of view that is obstructed by the dual-sided display panel 101 when in the first position (Position A). The rear-view enhancement system 117 also adds additional textual or graphical information to the images displayed to the driver including, for example, information such as weather (based on the color of the sky and presence/absence of clouds), distance from object/vehicle, and an identification of an object behind the vehicle.

Therefore, instead of merely obstructing the driver's view through the rear view mirror 109, the forward-facing display screen 107 of the dual-sided display panel 101 provides additional useful information. The information and views provided by the first camera 113 and the rear view enhancement system 117 are useful to a driver while operating the vehicle in reverse. As such, in some embodiments, the display system is configured to ensure that the dual-sided display 101 is in the lowered first position (Position A) when the vehicle is being operated in reverse.

Figure 5:
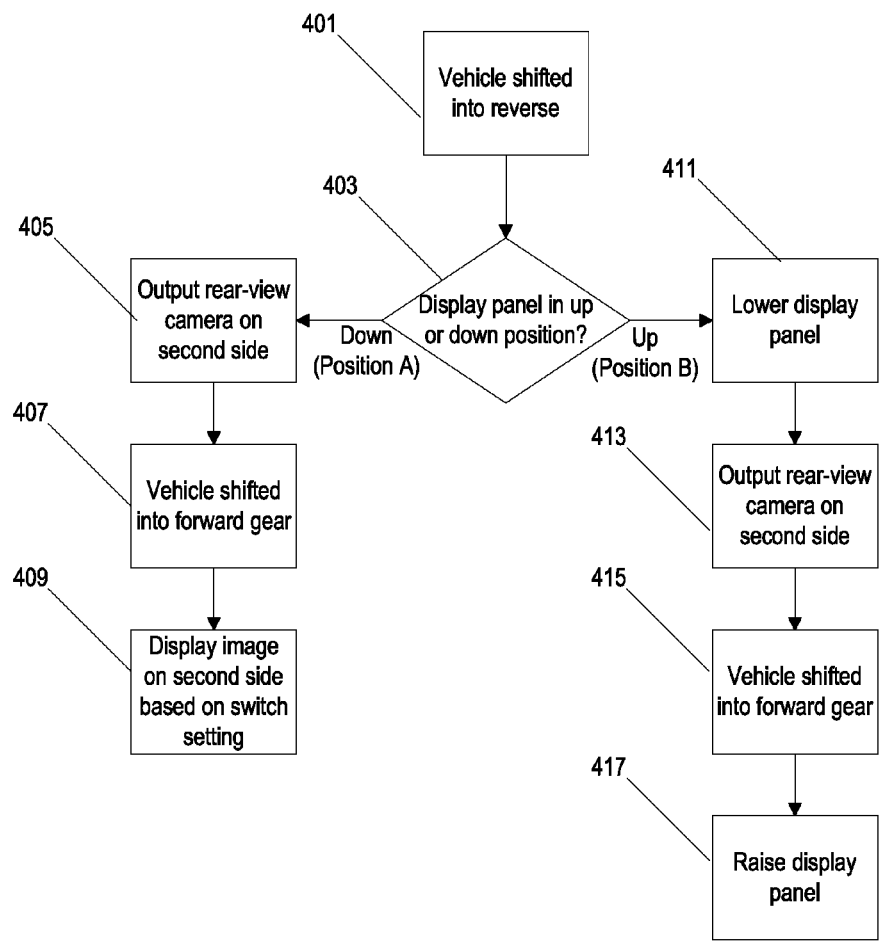
FIG. 5 is a flowchart illustrating how the position of the display panel and the content displayed to the driver of the vehicle are adjusted when the vehicle is operated in reverse.

FIG. 5 illustrates one method of adjusting the position of the dual-sided display panel 101 when the vehicle is operating in reverse. When the vehicle is shifted into a reverse gear (step 401), the system determines whether the dual-sided display panel 101 is in the up position (Position B) or the down position (Position A). If the dual-sided display panel 101 is already lowered, the system displays the images captured by the first camera 113 and processed by the rear-view enhancement system 117 on the forward-facing display screen 107 (step 405). While in reverse, images from the first camera 113 (e.g., the rear-view camera) are displayed on the forward-facing display screen 107 regardless of the position of the driver mode switch 111. The rear-view images from the first camera 113 are displayed on the forward-facing display screen 107 until the vehicle is shifted into the forward gear (step 407). At that time, a video image is displayed on the forward-facing display screen 107 based on the position of the driver mode switch 111 (step 409).

However, when the dual-sided display panel 101 is in the raised position (Position B) when the vehicle is shifted into a reverse gear, the system automatically lowers the dual-sided display panel 101 into the lowered position (Position A) (step 411). Again, the video captured by the first camera 113 and processed by the rear-view enhancement system 117 is displayed on the forward-facing display screen 107 (step 413) and is viewable by the driver through the rear-view mirror. When the vehicle is shifted out of the reverse gear (step 415), the system automatically raises the display panel to the second position (Position B) (step 417) as it was before the vehicle was shifted into the reverse gear.

Thus, the invention provides, among other things, a display system including a dual-sided display panel that presents alternative views and additional information to the driver of a vehicle through the rear view mirror. The source of the video images displayed to the driver is selected by the driver independent of the video source that is displaying images to a passenger in the rear-seating area of the vehicle on the opposite side of the display panel. In some embodiments, the system automatically lowers the display screen when the vehicle is being operated in reverse. Various features and advantages of the invention are set forth in the following claims.

What is claimed is:

1. A display system for a vehicle comprising:
   a display panel mountable to the interior ceiling of a vehicle, the display panel including
      a first side display screen viewable by a rear-seat passenger in the vehicle when the display panel is in a first panel position, and
      a second side display screen positioned on the opposite side of the display panel from the first side display screen and viewable by a driver of the vehicle through an interior rear-view mirror of the vehicle when the display panel is in the first panel position;
   a hinge pivotably connecting the display panel to a base and allowing the display panel to be moved between the first panel position wherein the display panel is substantially perpendicular to the interior ceiling of the vehicle and a second panel position wherein the display panel does not obstruct a field of view of the interior rear view mirror;
   a motor configured to move the display panel between the first panel position and the second panel position;
   a first camera mountable to a rear portion of the vehicle and configured to capture images of a rear view of the vehicle;
   a second camera configured to capture images of the rear-seat passenger;
   a switch; and
   a processor configured to
      display the images from a media device on the first side display screen when the display panel is in the first panel position,
      receive a signal from the switch indicating whether the switch is in a first switch position or a second switch position,
      display images from the first camera on the second side display screen when the display panel is in the first panel position and the switch is in the first switch position,
      display images from the second camera on the second side display screen when the display panel is in the first panel position and the switch is in the second switch position,
      receive a first signal from the vehicle when the vehicle is operating in reverse, and
      cause the motor to move the display panel from the second panel position to the first panel position in response to receiving the first signal such that the second side display screen is viewable by the driver of the vehicle through the interior rear view mirror when the vehicle is operating in reverse.

2. The display system of claim 1, further comprising a user control and wherein the processor is further configured to cause the motor to move the display panel between the first panel position and the second panel position in response to receiving a signal from the user control.

3. The display system of claim 1, wherein the processor is further configured to display images from the first camera on the second side display screen when the display screen is in the first panel position and the vehicle is operating in reverse regardless of the position of the switch.

4. The display system of claim 1, wherein the processor is further configured to
   determine whether the display panel is in the first panel position or the second panel position when the first signal is received indicating that the vehicle is operating in reverse,
   cause the motor to move the display panel from the second panel position to the first panel position if the display panel is in the second panel position when the first signal is received,
   receive a second signal from the vehicle indicating that the vehicle has begun operating in the forward direction after operating in a reverse direction, and
   cause the motor to move the display panel from the first panel position to the second panel position in response to receiving the second signal if the processor previously determined that the display panel was in the second panel position when the first signal was received.

5. The display system of claim 1, wherein the media device includes at least one of a DVD player, a video game system, and a laptop personal computer.

6. The display system of claim 1, wherein the switch includes a third switch position and wherein the processor is further configured to display images from an additional video source on the second side display screen when the display panel is in the first panel position and the switch is in the third switch position.

7. A method of operating a display system for a vehicle including a dual-sided display panel pivotably connected to a base allowing the dual-sided display panel to be moved between a first panel position wherein the dual-sided display panel is substantially perpendicular to the interior ceiling of a vehicle and a second panel position wherein the dual-sided display panel does not obstruct a field of view of an interior rear-view mirror of the vehicle, the method comprising:
   positioning the dual-sided display panel in the first position so that a first side display screen is viewable by a rear-passenger in the vehicle and a second side display screen positioned on the opposite side of the display panel from the first side display screen is viewable by a driver of the vehicle through an interior rear-view mirror of the vehicle;
   displaying images from a media device on the first side display screen when the dual-sided display panel is in the first panel position;

receiving a signal from a user-operated switch indicating whether the switch is in a first switch position or a second switch position;

displaying images from a first camera on the second side display screen when the dual-sided display panel is in the first panel position and the switch is in the first switch position, the first camera being mounted on a rear portion of the vehicle and configured to capture images of a rear view of the vehicle;

displaying images from a second camera on the second side display screen when the dual-sided display panel is in the first panel position and the switch is in the second switch position, the second camera being positioned to capture images of the rear-seat passenger of the vehicle;

receiving a first signal from the vehicle when the vehicle is operating in reverse; and causing a motor to move the display panel from the second panel position to the first panel position in response to receiving the first signal such that the second side display screen is viewable by the driver of the vehicle through the interior rear view mirror when the vehicle is operating in reverse.

8. The method of claim 7, further comprising:
receiving a signal from a user control; and
activating the motor to move the dual-sided display panel between the first panel position and the second panel position in response to the signal from the user control.

9. The method of claim 7, further comprising displaying images from the first camera on the second side display screen when the dual-sided display panel is in the first position and the vehicle is operating in reverse regardless of the position of the switch.

10. The method of claim 7, further comprising:
determining whether the dual-sided display panel is in the first panel position or the second panel position when the first signal is received;
activating the motor to move the dual-sided display panel from the second panel position to the first panel position in response to receiving the first signal when the dual-sided display panel is in the second panel position;
receiving a second signal from the vehicle indicating that the vehicle has begun operating in a forward direction after operating in a reverse direction; and
activating the motor to move the dual-sided display panel from the first panel position to the second panel position in response to receiving the second signal if it has been determined that the dual-sided display panel was in the second panel-position when the first signal was received.

11. The method of claim 7, wherein the act of display images from a media device includes receiving image data from at least one of a DVD player, a video game system, and a laptop personal computer.

12. The method of claim 7, further comprising displaying images from an additional video source on the second side display screen when the dual-sided display panel is in the first panel position and the switch is in a third switch position.

13. A method of operating a display system for a vehicle including a dual-sided display panel that is controllably movable between a first panel position and a second panel position, wherein a first side display screen of the dual-sided display panel is viewable by a rear-seat passenger and a second side display screen, positioned on the opposite side of the display panel from the first side display screen, is viewable by a driver of the vehicle through an interior rear view mirror when the display panel is in the first panel position, and wherein the dual-sided display panel does not obstruct the interior rear view mirror when the display panel is in the second panel position, the method comprising:
receiving a signal from the vehicle when the vehicle is operating in reverse;

causing the display panel to move from the second panel position to the first panel position in response to receiving the first signal such that the second side display screen is viewable by the driver of the vehicle through the interior rear view mirror when the vehicle is operating in reverse; and displaying images from a first camera on the second side display screen when the dual-sided display panel is in the first panel position, the first camera being mounted on a rear portion of the vehicle and configured to capture images of a rear view of the vehicle.

14. A display system for a vehicle comprising:
a display panel mountable to the interior ceiling of a vehicle, the display panel including a first side display screen and a second side display screen positioned on the opposite side of the display panel from the first side display screen, the display panel being controllably movable between a first panel position and a second panel position, wherein the first side display screen is viewable by a rear-seat passenger and the second side display screen is viewable by a driver of the vehicle through an interior rear view mirror when the display panel is in the first panel position, and wherein the display panel does not obstruct the interior rear view mirror when the display panel is in the second panel position;

a first camera mountable to a rear portion of the vehicle and configured to capture images of a rear view of the vehicle; and a processor configured to
receive a signal from the vehicle when the vehicle is operating in reverse, cause the display panel to be moved from the second panel position to the first panel position in response to receiving the first signal such that the second side display screen is viewable by the driver of the vehicle through the interior rear view mirror when the vehicle is operating in reverse, and display images from the first camera on the second side display screen when the display panel is in the first panel position and the switch is in the first switch position.

* * * * *